United States Patent
Jiang et al.

(10) Patent No.: US 10,364,334 B2
(45) Date of Patent: Jul. 30, 2019

(54) CONTINUOUS PRODUCTION EQUIPMENT AND PREPARATION METHOD FOR GRAPHENE COMPOSITE MATERIAL

(71) Applicant: CHANGZHOU HIGHBERY NEW NANO MATERIALS TECHNOLOGY CO., LTD., Changzhou (CN)

(72) Inventors: Yan Jiang, Changzhou (CN); Rongqing Huang, Changzhou (CN); Zhenyang Luo, Nanjing (CN); Yan Liang, Beijing (CN); Hongming Ma, Changzhou (CN); Jianpeng Cao, Changzhou (CN); Lu Zhou, Changzhou (CN); Xuejing Liu, Changzhou (CN); Shulie Dai, Changzhou (CN)

(73) Assignee: CHANGZHOU HIGHBERY NEW NANO MATERIALS TECHNOLOGY CO., LTD., Changzhou (CN)

(*) Notice: Subject to any disclaimer, the term of this patent is extended or adjusted under 35 U.S.C. 154(b) by 89 days.

(21) Appl. No.: 15/740,519

(22) PCT Filed: Nov. 27, 2017

(86) PCT No.: PCT/CN2017/113185
§ 371 (c)(1),
(2) Date: Dec. 28, 2017

(87) PCT Pub. No.: WO2018/184393
PCT Pub. Date: Oct. 11, 2018

(65) Prior Publication Data
US 2018/0312658 A1   Nov. 1, 2018

(30) Foreign Application Priority Data

Apr. 6, 2017 (CN) .......................... 2017 1 0222715

(51) Int. Cl.
*B01J 19/00* (2006.01)
*B01J 19/06* (2006.01)
(Continued)

(52) U.S. Cl.
CPC ............... *C08K 3/042* (2017.05); *B01J 19/06* (2013.01); *B01J 19/10* (2013.01); *B01J 19/1806* (2013.01);
(Continued)

(58) Field of Classification Search
CPC ... B01J 19/00; B01J 19/06; B01J 19/08; B01J 19/10; B01J 19/18; B01J 19/1806;
(Continued)

(56) References Cited

U.S. PATENT DOCUMENTS

| | | | | |
|---|---|---|---|---|
| 2006/0217522 A1* | 9/2006 | Demeter | ................. | B01J 19/02 528/312 |
| 2008/0275176 A1* | 11/2008 | Limin | .................... | B82Y 30/00 524/493 |
| 2014/0256905 A1* | 9/2014 | Biedasek | ............... | C08G 69/14 528/323 |

FOREIGN PATENT DOCUMENTS

| CN | 101928457 A | 12/2010 |
|---|---|---|
| CN | 103450674 A | 12/2013 |

(Continued)

OTHER PUBLICATIONS

Machine translation of CN 101928457 A, which was provided in PDs filed on Mar. 6, 2018 and published Dec. 29, 2018 (Year: 2018).*

*Primary Examiner* — Natasha E Young
(74) *Attorney, Agent, or Firm* — SZDC Law P.C.

(57) ABSTRACT

Continuous production equipment for graphene composite material includes a raw material preparation device; a reaction device, a material discharge end of the raw material
(Continued)

preparation device being connected to the reaction device; and an extraction device configured to extract and purify crude composite material obtained from the reaction device, a material feed end of the extraction device being connected to the material discharge end of the reaction device, and a material discharge end of the extraction device being configured to convey polyamide monomer extract obtained by extraction to a liquid conveying pipe of the raw material preparation device. The raw material preparation device includes a raw material melting kettle configured to melt polyamide monomer and mix the molten polyamide monomer with graphene, and the raw material melting kettle is provided with a high-shear emulsifying machine and an ultrasonic disperser.

17 Claims, 1 Drawing Sheet

(51) Int. Cl.
| | | |
|---|---|---|
| *B01J 19/08* | (2006.01) | |
| *B01J 19/10* | (2006.01) | |
| *C08G 69/16* | (2006.01) | |
| *C08L 77/02* | (2006.01) | |
| *C08K 3/04* | (2006.01) | |
| *B01J 19/18* | (2006.01) | |

(52) U.S. Cl.
CPC .............. *C08G 69/16* (2013.01); *C08L 77/02* (2013.01); *B01J 2219/00033* (2013.01); *B01J 2219/089* (2013.01); *B01J 2219/0869* (2013.01); *C08K 2201/011* (2013.01)

(58) Field of Classification Search
CPC .......... B01J 2219/00; B01J 2219/00002; B01J 2219/00027; B01J 2219/00033; B01J 2219/08; B01J 2219/0869; B01J 2219/0873; B01J 2219/0881; B01J 2219/089; C08G 69/00; C08G 69/02; C08G 69/08; C08G 69/14; C08G 69/16; C08K 3/00; C08K 3/02; C08K 3/04; C08K 3/042; C08K 2201/011
See application file for complete search history.

(56) References Cited

FOREIGN PATENT DOCUMENTS

| | | |
|---|---|---|
| CN | 104404646 A | 3/2015 |
| CN | 104448564 A | 3/2015 |
| CN | 106928448 A | 7/2017 |
| WO | 2014062226 A1 | 4/2014 |
| WO | 2014172619 A1 | 10/2014 |

\* cited by examiner

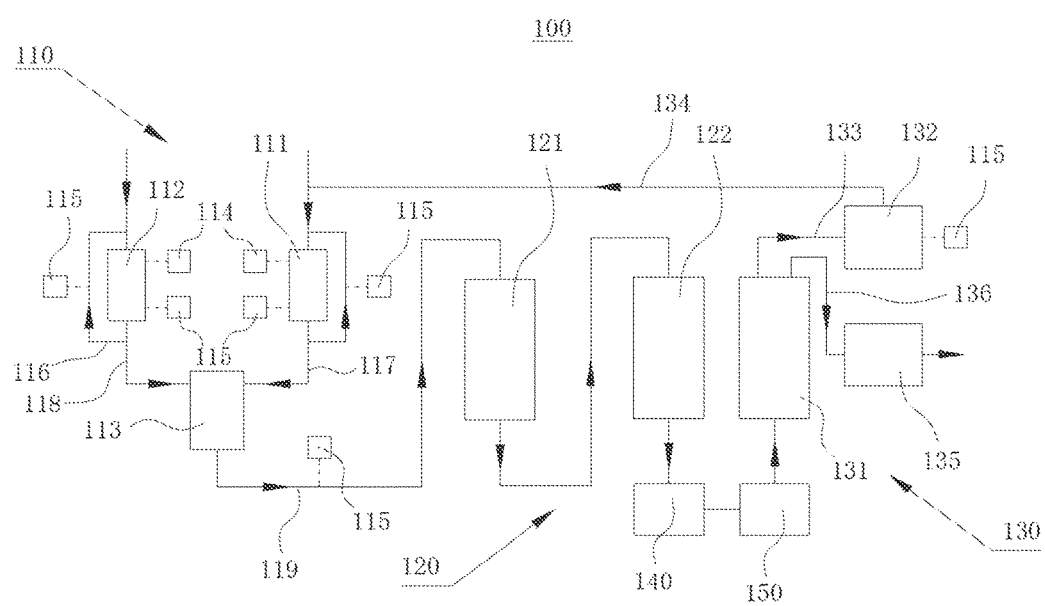

CONTINUOUS PRODUCTION EQUIPMENT AND PREPARATION METHOD FOR GRAPHENE COMPOSITE MATERIAL

CROSS-REFERENCE TO RELATED APPLICATIONS

The present application is a PCT National Phase Application of PCT/CN2017/113185, now WO 2018/184393, filed on Nov. 27, 2017, which claims the priority to Chinese Patent Application No. 201710222715.5, submitted to the Chinese Patent Office on Apr. 6, 2017 and entitled "CONTINUOUS PRODUCTION EQUIPMENT AND PREPARATION METHOD FOR GRAPHENE COMPOSITE MATERIAL" the disclosure of which is herein incorporated by reference in its entirety.

TECHNICAL FIELD OF THE INVENTION

The present invention relates to the field of composite material and in particular to continuous production equipment and a preparation method for graphene composite material.

BACKGROUND OF THE INVENTION

Graphene is two-dimensional monoatomic carbon material formed from sp2-hybridized carbon atoms. Due to its excellent electrical properties, thermal properties, mechanical properties and biological relevance, graphene has been widely applied. Graphene can be used as an ideal nano-filler for preparing composite material. Due to its excellent characteristics, graphene can endow other materials with excellent properties if being composited with these materials. Therefore, graphene composite material has rapidly become a hot topic in the research field of nanocomposite material.

Polyamide, also called nylon, is a collective term of high polymers containing amide groups in repeating units of the macromolecular backbone. Polyamide itself has good overall performance, including mechanical properties, heat resistance, wear resistance, chemical resistance, self-lubricity and the like, and is thus a kind of important high polymer material.

When graphene is used as a reinforced phase of polyamide, due to the large specific surface area and high adhesion between graphene and polyamide, the related properties, such as crystallization properties, thermostability, electrical conductivity, thermal conductivity and mechanical properties, of nylon can be improved by the excellent characteristics of graphene. In this way, the application range of polyamide material is expanded. Therefore, the research on graphene polyamide composite material has attracted more and more attention.

At present, there are following two main methods for preparing graphene/polyamide composite material: melt-blending and in-situ polymerization. In-situ polymerization means that graphene and polyamide monomer are together added to a reactor and then polymerized to obtain the desired composite material. By this method, the problems of dispersion and compatibility of graphene nanoflakes in the polyamide matrix can be solved, and composite material with high dispersibility can be obtained.

However, in the prior art, the in-situ polymerization of graphene and polyamide is realized only in laboratories. It has not yet been used in large-scale industrial production. How to introduce graphene into the existing industrial polyamide polymerization production processes and effectively disperse graphene in polyamide is a problem that must be solved to realize the industrial production of graphene and polyamide composite material.

SUMMARY OF THE INVENTION

An objective of the present invention is to provide continuous production equipment for graphene composite material, which has a rational layout, a simple structure, good dispersion effect and high production efficiency. By the continuous production equipment, graphene material can be effectively dispersed in polyamide and the large-scale industrial production of graphene composite material can be realized. Furthermore, by the continuous production equipment, the polyamide monomer which has not been completely reacted during a reaction can be recycled, and the production cost can be reduced.

Another objective of the present invention is to provide a preparation method for graphene composite material, which is simple and convenient in operation. By the preparation method, graphene material can be effectively dispersed in polyamide and the large-scale industrial production of graphene composite material can be realized. Furthermore, by the preparation method, the polyamide monomer which has not been completely reacted during a reaction can be recycled, and the production cost can be reduced.

The embodiments of the present invention will be implemented below.

Continuous production equipment for graphene composite material is provided, including a raw material preparation device and a reaction device, a material discharge end of the raw material preparation device being connected to the reaction device; the continuous production equipment further includes an extraction device configured to extract and purify crude composite material obtained from the reaction device, a material feed end of the extraction device is connected to the material discharge end of the reaction device, and a material discharge end of the extraction device is configured to convey polyamide monomer extract obtained by extraction to a liquid conveying pipe of the raw material preparation device; and the raw material preparation device includes a raw material melting kettle configured to melt polyamide monomer and mix the molten polyamide monomer with graphene, and the raw material melting kettle is provided with a high-shear emulsifying machine and an ultrasonic disperser.

A preparation method for graphene composite material is provided, including the steps of: melting polyamide monomer and graphene material in a raw material melting kettle, and peeling, dispersing and mixing under the combined action of a high-shear emulsifying machine and an ultrasonic disperser to obtain a mixture; conveying the mixture to a reaction device for polymerization reaction to obtain crude composite material; and, conveying the crude composite material to an extraction device for extraction and separation to obtain graphene composite material, and conveying polyamide monomer extract obtained by extraction back to a raw material preparation device by the liquid conveying pipe for recycle.

The embodiments of present invention have the following beneficial effects. The present invention provides continuous production equipment for graphene composite material, including a raw material preparation device and a reaction device. The raw material preparation device includes a raw material melting kettle which is provided with a high-shear emulsifying machine and an ultrasonic disperser. By the continuous production equipment, during the preparation of polyamide monomer, graphene can be better dispersed in the polyamide monomer by the combined action of high-shear stirring and ultrasonic dispersion while melting the raw material. In this way, graphene composite material with good dispersibility and excellent properties is obtained. Meanwhile, the continuous production equipment further includes an extraction device by which the polyamide monomer which has not been completely reacted during a reaction can be recycled. In this way, the raw material utilization rate is improved and the production cost is reduced.

The present invention provides a preparation method for graphene composite material. The method solves the problem of low dispersibility of graphene composite material during large-scale industrial production. With the use of the continuous production equipment for graphene composite material, during the preparation, graphene can be effectively dispersed in the polyamide by the combined action of high-shear stirring and ultrasonic dispersion. In this way, graphene composite material with good dispersibility and excellent properties is obtained. Meanwhile, by this preparation method, the polyamide monomer which has not been completely reacted during a reaction can be recycled. In this way, the raw material utilization rate is improved and the production cost is reduced.

BRIEF DESCRIPTION OF THE DRAWINGS

To describe the technical solutions of the embodiments of the present invention more clearly, drawings to be used in the embodiments will be briefly introduced below. It should be understood that the drawings to be described below merely show some embodiments of the present invention and therefore shall not be regarded as any limitations to the scope. Other drawings may be obtained by a person of ordinary skill in the art according to those drawings without paying any creative effort.

FIG. 1 is a schematic flow diagram of continuous production equipment for graphene composite material according to Embodiment 1 of the present invention, in which:

100: continuous production equipment; 110: raw material preparation device; 111: raw material melting kettle; 112: auxiliary material tank; 113: mixer; 114: high-shear emulsifying machine; 115: ultrasonic disperser; 116: bypass pipe; 117: raw material conveying pipe; 118: auxiliary material conveying pipe; 119: material conveying pipe; 120: reaction device; 121: first reaction kettle; 122: second reaction kettle; 130: extraction device; 131: extractor; 132: extract tank; 133: extract conveying pipe; 134: liquid conveying pipe; 135: drier; 136: product conveying pipe; 140: water tank; and 150: granulator.

DETAILED DESCRIPTION OF THE INVENTION

To make the objectives, technical solutions and advantages of the embodiments of the present invention more clear, the technical solutions of the embodiments of the present invention will be described clearly and completely below. Where no specific condition is indicated in the embodiments, operations shall follow the conventional conditions or conditions suggested by the manufacturer. Where no manufacturer is indicated, the used reagents or instruments are commercially available conventional products.

The continuous production equipment and preparation method for graphene composite material according to embodiments of the present invention will be specifically described below.

An embodiment of the present invention provides continuous production equipment for graphene composite material, including a raw material preparation device and a reaction device, a material discharge end of the raw material preparation device being connected to the reaction device. The continuous production equipment further includes an extraction device configured to extract and purify crude composite material obtained from the reaction device, a material feed end of the extraction device is connected to the material discharge end of the production device, and a material discharge end of the extraction device is configured to convey polyamide monomer extract obtained by extraction to a liquid conveying pipe of the raw material preparation device. The raw material preparation device includes a raw material melting kettle configured to melt polyamide monomer and mix the molten polyamide monomer with graphene, and the raw material melting kettle is provided with a high-shear emulsifying machine and an ultrasonic disperser.

An ultrasonic disperser is provided in at least one pipe of the continuous production equipment. Preferably, an ultrasonic disperser is provided in at least one pipe of the raw material preparation device, or an ultrasonic disperser is provided in at least one pipe of the extraction device, or an ultrasonic disperser is provided in a pipe between the raw material preparation device and the reaction device. During the practical industrial production, the pipeline or pipe between the used devices is generally long. In the embodiment of the present invention, by providing ultrasonic dispersers in the pipes, graphene passing through the pipes can be always in a liquid-state ultrasonic peeling state even during the conveying of graphene in the pipes. This avoids the agglomeration of graphene and thus prevents graphene from becoming multi-layered graphite packing. In this way, the quality of the subsequent production is effectively ensured and the meaning of the graphene nano-modification is ensured.

With regard to the raw material preparation device, preferably, a material discharge end of the raw material melting kettle is communicated with a material feed end thereof by a bypass pipe. In this way, the polyamide monomer and the graphene material, which are molten in the raw material melting kettle, can go into the bypass pipe from the material discharge end of the raw material melting kettle and back to the raw material melting kettle from the material feed end of the raw material melting kettle to realize circulation. Here, repeatedly processing enables material to be mixed more uniformly and results in better peeling and dispersion effect of the graphene material. Furthermore, preferably, an ultrasonic disperser is provided in the bypass pipe. In this way, during the circulation of material, the material can be ultrasonically peeled and dispersed by the ultrasonic disperser arranged in the bypass pipe, so that the graphene material can be further peeled and dispersed and then mixed sufficiently, in a nanometer state, with the polyamide monomer.

In addition to the raw material melting kettle, the raw material preparation device can further include at least one auxiliary material tank in which the auxiliary material, the polyamide monomer and the graphene are mixed. The auxiliary material tank is also provided with a high-shear emulsifying machine and an ultrasonic disperser. The arrangement of a high-shear emulsifying machine and an ultrasonic disperser in the auxiliary material tank can provide for sufficient ultrasonic peeling, dispersion and mixing of the graphene material and the auxiliary material in the auxiliary material tank. Preferably, similarly to the raw material melting kettle, the auxiliary material tank may be provided with a bypass pipe by which the auxiliary material and the graphene material can be mixed more uniformly and sufficiently. During the practical production, the stirring operation in the raw material melting tank is difficult due to its large volume, and in contrast, the stirring operation can be carried out in the auxiliary material tank more effectively and in higher-quality due to its small volume. Therefore, further, a plurality of auxiliary material tanks may be provided. By providing a plurality of auxiliary material tanks, the auxiliary material can be stirred separately. The stirring burden of the raw material melting kettle is shared effectively. Therefore, the polyamide monomer and the graphene material can be mixed more sufficiently. Furthermore, the plurality of auxiliary material tanks can be used for introducing a plurality of kinds of auxiliary material, respectively. Therefore, various kinds of auxiliary material can be blended into the system well.

For further mixing, the raw material preparation device can further includes a mixer, a material discharge end of the raw material melting kettle is connected to a material feed end of the mixer by a raw material conveying pipe, a material discharge end of the auxiliary material tank is connected to the material feed end of the mixer by an auxiliary material conveying pipe, and a material discharge end of the mixer is connected to the reaction device. The raw material melting kettle and the auxiliary material tank each process the material contained therein and the material contained therein is conveyed to the mixer by pipes. In the mixer, the polyamide monomer, the graphene material and the auxiliary material are mixed sufficiently and then conveyed to the reaction device for polymerization.

The communication of the raw material preparation device with the reaction device is realized by a material conveying pipe, one end of which is connected to the material discharge of the raw material preparation device and the other end of which is connected to the material feed end of the reaction device. An ultrasonic disperser may be provided in the material conveying pipe. In this way, during a process in which the mixture discharged from the raw material preparation device is conveyed to the reaction device by the material conveying pipe, the mixture in the pipe can be ultrasonically peeled and dispersed by the ultrasonic disperser, so that the graphene in the mixture can be always in a liquid-state ultrasonic peeling state and thus the dispersibility of the graphene material is maintained. Meanwhile, the graphene material can be further peeled and dispersed to ensure that, before being passed to the reaction device, the mixture is always in a good preparation state. Also, this enables the graphene composite material obtained by polymerization to be more uniform and to have better performance. This processing method, i.e., the use of ultrasonic dispersers during the conveying process to maintain the dispersibility, is a technical solution obtained by the inventor by utilizing his/her own experience and paying creative effort, in order to adapt to large-scale industrial production while ensuring the quality of products, and is thus the wisdom of the inventor.

With regard to the reaction device, it may include a single reaction kettle or a plurality of reaction kettles. Preferably, the reaction device may include a plurality of reaction kettles connected in series. The connection of reaction kettles in series ensures that different pressures and temperatures may be used in reaction kettles according to different reaction progresses. In this way, the reaction may become more effective. With regard to the extraction device, it includes an extractor configured to extract and separate crude graphene composite material obtained from the reaction device and an extract tank in which the polyamide monomer extract and the graphene are mixed. A material feed end of the extractor is connected to the material discharge end of the reaction device, and a material discharge end of the extractor is communicated with the material feed end of the extract tank; a material discharge end of the extract tank is communicated with the raw material preparation device by the liquid conveying pipe; and an external graphene charge pipe is communicated with the extract tank. The crude graphene composite material is obtained by the polymerization in the reaction device. The crude graphene composite material is extracted and separated in the extractor to obtain the graphene composite material and the polyamide monomer (extract) which has not been completely reacted. The obtained graphene composite material is conveyed to the next procedure to be processed. The extracted polyamide monometer extract is conveyed to the extract tank and then back to the raw material preparation device by the liquid conveying pipe to be recycled.

Further, an ultrasonic disperser is provided in the extract tank. In this way, the material (especially graphene) in the extract tank can be ultrasonically dispersed.

In addition, an embodiment of the present invention further provides a preparation method for graphene composite material, including a material processing step of: melting polyamide monomer and graphene material in a raw material melting kettle, and peeling, dispersing and mixing under the combined action of a high-shear emulsifying machine and an ultrasonic disperser to obtain a mixture.

The percentage by mass of the graphene material to the polyamide monomer is 0.05-5%. This percentage is obtained by the inventor by utilizing his/her own experience and paying creative effort. Within this percentage range, the graphene material is well dispersed and the obtained graphene composite material has better performance.

Graphene is a honeycomb flat film formed by sp2-hybridization. As quasi-two-dimensional material having a thickness equal to a single atomic layer, graphene is also called monoatomic graphite. Graphene has a thickness of about 0.335 nm, which is different according to different preparation methods, a height of usually about 1 nm in the vertical direction, and a width of about 10 nm to 25 nm in the horizontal direction. Graphene is the primary structure unit of all carbon crystals except for diamonds. In a preferred embodiment of the present invention, the graphene material includes one or more of functionalized graphene, oxidized graphene and pure graphene. The pure graphene with an integral structure is highly chemical stable, with its surface being inert, low interaction with other media (for example, solvents). Furthermore, agglomeration may easily occur in graphene due to the high van der Waals' force between the graphene flakes. The introduction of specific functional groups can increase the dispersibility of the graphene, and also endow the graphene with new properties. Thus, the application range of the graphene is further expanded. Therefore, in an embodiment of the present invention, the graphene has a functional group which is selected from one or more of amide, amino, carboxyl, sulfonic group, epoxy group and hydroxyl, preferably amino. That is, the graphene is preferably amino graphene, and preferably, the amino graphene has a flake diameter of 50-800 nm. The selection of such a flake diameter can ensure the successful application of the produced graphene composite material in spinning.

Polyamide is a collective term of high polymers containing amide groups in repeating units of the macromolecular backbone. Polyamide has good overall performance, including mechanical properties, heat resistance, wear resistance, chemical resistance, self-lubricity and the like. Furthermore, polyamide has a low friction coefficient, and is somewhat flame retarded and easy to process. It may be filled with other fillers to reinforce the modification, improve the performance and expand its application range. In an embodiment of the present invention, the polyamide includes but is not limited to any one of PA6, PA66, PA11, PA12, PA610, PA1010, PA46, PA1012, PA1212 and PA56.

In the material processing step of the preparation method for graphene composite material, the step of melting polyamide monomer and graphene material in a raw material melting kettle further includes the steps of: peeling and dispersing the graphene material in a liquid in ultrasonic condition, then adding the obtained substance to the molten polyamide monomer, and mixing, wherein the liquid is water or a polyamide monomer solution with water as a solvent. The graphene material is ultrasonically peeled and dispersed in water or in a polyamide monomer solution in advance and then added to the molten polyamide monomer. That is, the graphene uses water or a polyamide monomer solution system as a carrier for its liquid-phase ultrasonic peeling, and is then mixed with the molten polyamide monomer. In this way, the liquid-phase ultrasonic peeling state can still be maintained due to the overlarge specific surface area between graphene and polyamide even if the graphene is in the small-size nanometer state. Thus, the agglomeration caused by directly adding the graphene to the polyamide monomer is avoided, and the problem of extremely low spinnability of the produced graphene composite material in spinning is accordingly avoided. By ingenious ideas of the inventor, during the design of the continuous production equipment, it is preferable to design an external graphene charge pipe to be communicated with the extract tank. Thus, the graphene can be ultrasonically peeled and dispersed in the polyamide monomer extract in advance (due to the selection of raw material in operations in the earlier stage, water and polyamide monomer are mainly contained in the extract obtained in the later stage), and then conveyed to the raw material melting kettle of the raw material preparation device to be mixed with the molten polyamide monomer, even in the circulation process for recycle. Therefore, the graphene can be always in a liquid-phase ultrasonic peeling state. The agglomeration caused by directly adding the graphene to the polyamide monomer is avoided. Preferably, an ultrasonic disperser may also be provided in the liquid conveying pipe. Further, during the process, on-line sampling may be performed for content analysis, in order to ensure the accuracy of charge percentage of the graphene in the final product. All those process requirements are completely different from the batch polymerization process.

The graphene is peeled and dispersed in a liquid in ultrasonic condition. Specifically, the ultrasonic condition is a condition having an ultrasonic power of 1-20 kW; and the percentage by mass of water to the polyamide monomer in the polyamide monomer solution is 0.5-30%, preferably 1-10%.

In the material processing step, preferably, by the high-shear emulsifying machines, the ultrasonic dispersers and the like, the material in the raw material melting kettle can be high-shear stirred, emulsified, ultrasonically peeled and dispersed, and the material in the pipes can also be ultrasonically peeled and dispersed.

The material processing step further includes the addition of auxiliary material usually used in the synthesis of the polyamides. The auxiliary material includes at least one of plasticizers, flexibilizers, flame retardants, antioxidants, reinforcing agents and colorants. Preferably, the percentage by mass of the auxiliary material to the sum of the polyamide monomer and the graphene material is 1-8%.

The plasticizers can increase the plasticity of the polyamide so that the polyamide is easy to process and the produced article is soft. The plasticizers include phthalates, diesters, epoxy esters, phosphates, polyesters, phenyl alkylsulfonates, chlorinated paraffins and the like. The flexibilizers can improve the impact strength of the material so that the material becomes more flexible. In the present invention, the flexibilizers include nonpolar polyolefin substance such as PP and PE, and elastomers such as EPDM and POE. The flame retardants can improve the flame-retarded performance of the material and the antioxidants can improve the anti-aging performance of the material. The reinforcing agents can provide further improvements to the properties of the material in terms of antistatic property, antibacterial property, wear resistance and the like.

In an embodiment of the present invention, in order to add the auxiliary material more uniformly, the polyamide monomer and the graphene material can be added to the auxiliary material tank to be molten and pre-mixed, so that the auxiliary material, the polyamide monomer and the graphene material coexist in the auxiliary material tank. The percentage by mass of the graphene material to the sum of the auxiliary material and the polyamide monomer in the auxiliary material tank is 0.55-4.5%.

The preparation method for graphene composite material according to the present invention further includes a reaction step of conveying the mixture to the reaction device for polymerization to obtain crude composite material.

According to different types of polyamides, the synthesis of polyamides can be realized by the ring-opening polymerization of lactam, or by the polymerization of diamines and binary acids. The following description will be given by taking PA6 as an example. Caprolactam is mixed with water, heated until caprolactam is completely molten, and then subjected to the polymerization. At the beginning of the polymerization, caprolactam is reacted with water to be ring-opened, and the ring-opened caprolactam is then polymerized to obtain the PA6. Preferably, the percentage by mass of water to caprolactam is 0.1-2%, and the temperature for heating and melting in the raw material melting kettle is 70-100° C. The ring-opening reaction of caprolactam can be quickened by an initiator which is any one of aminocaproic acid in water, aminocaproic acid in an organic solution, and hexanediamine in water, or liquid caprolactam can be directly used as raw material for polymerization to obtain the PA6. Preferably, the percentage by mass of the initiator to caprolactam is 0.05-1%, and the temperature for heating and melting in the raw material melting kettle is 70-100° C.

Another polymerization method for PA6 is anionic polymerization. That is, the caprolactam monomer is subjected to anionic ring-opening polymerization under the action of a catalyst (one or more of alkali metals, alkali metal oxides, alkali metal alcoholates, alkali metal hydroxides) and an initiator (lactams such as N-(aminohexanoyl)caprolactam and double-acylated lactam-1,6-hexanediamine, or isocyanates such as TDI) to produce the PA6. This method has the advantages of high reaction speed and high monomer conversion efficiency. Preferably, the percentage of the catalyst to the caprolactam is 0.15-1 mol %, the percentage of the initiator to the caprolactam is 0.5-2 mol %, and the temperature for polymerization in the reaction is 100-200° C.

The polymerization lasts for 4-6 h at a temperature of 220-300° C. Further, the polymerization includes a first polymerization performed under an increased pressure and at a temperature of 240-269° C. and a second polymerization performed under a reduced pressure and at a temperature of 270-300° C. By this polymerization method, the obtained products can have better quality. At the end of the reaction, after vacuuming, adjustment of viscosity and balancing by molecular weight, the temperature is decreased to 200-230° C. and the products are discharged. Preferably, the relative viscosity of the system is adjusted to a range from 2.2 to 3.4. Within this viscosity range, the fluidity of the system can be ensured so that it is convenient to process and meanwhile the obtained products have better dispersion effect. After being discharged, the products are cooled in a water tank to 0-50° C., and then granulated for standby.

The preparation method for graphene composite material according to the present invention further includes an extraction step of: conveying the crude composite material to the extraction device for extraction and separation to obtain graphene composite material, and conveying the extracted polyamide monomer extract back to the raw material preparation device by the liquid conveying pipe to be recycled. Recycling can effectively save the production cost for industrial production.

Specifically, the extraction device includes an extractor and an extract tank. The crude composite material is extracted in the extractor, the obtained graphene composite material is conveyed to the next procedure to be processed, and the polyamide monomer extract is conveyed to the extract tank.

Preferably, the graphene material can be added to the extract tank, and peeled and dispersed in the polyamide monomer extract by an ultrasonic dispersed. The sufficiently mixed polyamide monomer extract and graphene material are conveyed to the raw material preparation device by the liquid conveying pipe to be recycled. Since there may have been uniformly mixed raw material in the raw material preparation device, the pre-mixing of the polyamide monomer extract and the graphene material can avoid too much influence on the degree of dispersion of the raw material in the raw material preparation device from the polyamide monomer extract and the graphene material, so that a good degree of dispersion of the raw material is maintained. Meanwhile, further preferably, an ultrasonic disperser may be provided on the liquid conveying pipe to better maintain the dispersibility of the raw material in the pipe. Further, the percentage by mass of the graphene material added to the extract tank to the polyamide monomer extract is 1-8%. This percentage is obtained by the inventor by utilizing his/her own experience and paying creative effort. Within this percentage range, the graphene material is well dispersed and the obtained graphene composite material has better performance.

It is to be noted that, in the embodiment of the present invention, the used high-shear emulsifying machine has a stirring speed of 500-10000 r/min. Within this speed range, better dispersion of the graphene and the polyamide monomer can be ensured. By the high kinetic energy resulted from the high tangential velocity and high-frequency mechanical effect generated by the high-speed rotation of the rotor, the material is subjected to strong mechanical and hydraulic shearing, centrifugal extrusion, friction from the liquid layer, impacting and tearing, turbulence and the like in a narrow gap between the stator and the rotor, so that the graphene and the polyamide monomer are dispersed and emulsified uniformly and finely in an instant and then subjected to the high-frequency circulation to finally obtain a stable mixture. It is to be noted that, in other preferred embodiments of the present invention, the high-shear emulsifying machine may be replaced with a sander or other devices which can realize the effect of stirring and dispersing.

In addition, in the present invention, the used ultrasonic dispersers each have an ultrasonic power of 1-20 kW. This power range is a preferred peeling and dispersion condition obtained by the inventor by utilizing his/her own experience and paying creative effort. Within this power range, under the combined action of high-shear stirring and ultrasonic peeling and dispersion, the graphene can be dispersed and bonded onto the polyamide molecular chain in a proper nanometer state during the polymerization. Preferably, the ultrasonic peeling and dispersion lasts for 30-480 min. Within this time range, good peeling and dispersion effect can be obtained.

In the preparation method for graphene composite material according to the embodiment of the present application, by the structural arrangement, step operations and parameter selection as described above, it can be ensured that the graphene is always in the liquid-phase ultrasonic peeling state without agglomeration and is maintained in the two-dimensional nanometer state. This is the key especially to the graphene-modified nylon. Furthermore, in this preparation method, the conventional stirring method is omitted. This prevents graphene from becoming multi-layered graphite packing to lose the meaning of the nano-modification.

The features and performances of the present invention will be further described in detail by embodiments.

Embodiment 1

This embodiment provides continuous production equipment 100 for preparing graphene composite material, as shown in FIG. 1, including a raw material preparation device 110, a reaction device 120 and an extraction device 130. A material discharge end of the raw material preparation device 110 is connected to a material feed end of the reaction device 120, and a material discharge end of the reaction device 120 is connected to a material feed end of the extraction device 130.

As shown in FIG. 1, the raw material preparation device 110 includes a raw material melting kettle 111, an auxiliary material tank 112 and a mixer 113. The raw material melting kettle 111 is a place where the polyamide monomer is molten and initially mixed with the graphene material. The raw material melting kettle 111 itself has a heating function that melts the polyamide monomer, so that the polyamide monomer is better mixed with the graphene. The raw material melting kettle 111 is provided with a high-shear emulsifying machine 114 to directly high-shear stir the polymer monomer and the graphene material, which are in the molten state, inside the raw material melting kettle 111, so that they can be sufficiently mixed. Meanwhile, the raw material melting kettle 111 is further provided with an ultrasonic disperser 115 to ultrasonically peel and disperse the graphene material inside the raw material melting kettle 111, so that the graphene material can be sufficiently mixed, in a nanometer state, with the polyamide monomer.

In this embodiment, a material discharge end of the raw material melting kettle 111 is connected to a material feed end of the raw material melting kettle 111 by a bypass pipe 116. To obtain better peeling and dispersion effect, an ultrasonic disperser 115 for ultrasonically peeling and dispersing the material in the bypass pipe 116 is provided in the bypass pipe 116. The polymer monomer and the graphene material are circulated between the bypass pipe 116 and the raw material melting kettle 111, and synchronously, ultrasonically peeled and dispersed in the raw material melting kettle 111 and the bypass pipe 116 to better form the graphene material in the nanometer state. The graphene material in the nanometer state is well dispersed in the polyamide monomer.

Further, the auxiliary material tank 112 is a place where various kinds of auxiliary material are molten and initially mixed with the polyamide monomer and the graphene material. The auxiliary material tank 112 is provided with a high-shear emulsifying machine 114 to directly high-shear stir the auxiliary material, the polymer monomer and the graphene material inside the auxiliary material tank 112, so that they can be sufficiently mixed. Meanwhile, the auxiliary material tank 112 is further provided with an ultrasonic disperser 115 to ultrasonically peel and disperse the graphene material inside the auxiliary material tank 112, so that the graphene material can be sufficiently mixed, in a nanometer state, with the auxiliary material and the polyamide monomer. In this embodiment, a bypass pipe 116 is also provided between a material discharge end and a material feed end of the auxiliary material tank 112 to enhance the mixing between the graphene material and the auxiliary material so as to obtain better dispersion effect. Similarly, an ultrasonic disperser 115 for ultrasonically peeling and dispersing the material in the bypass pipe 116 is also provided in the bypass pipe 116.

The raw material melting kettle 111 and the auxiliary material tank 112 are connected to a mixer 113 by a raw material conveying pipe 117 and an auxiliary material conveying pipe 118, respectively. The auxiliary material and the polyamide monomer, which are respectively pre-mixed with the graphene material, are gathered in the mixer 113 for further mixing. In this embodiment, the mixer 113 is a static mixer having the advantages of high efficiency, low energy consumption, small volume, reduced investment and easy continuous production. By the static mixer, the auxiliary material, the polymer monomer and the graphene material can be effectively and sufficiently mixed. In other preferred embodiments of the present invention, the mixer 113 also adopts the high-shear stirring method. Meanwhile, an ultrasonic disperser 115 is also provided in the mixer 113 to further peel and disperse the graphene material.

A material discharge end of the mixer 113 is connected to a material feed end of the reaction device 120 by a material conveying pipe 119. An ultrasonic disperser 115 for ultrasonically peeling and dispersing the material in the material conveying pipe 119 is provided in the material conveying pipe 119, in order to further peel and disperse the graphene in the material and further mix the material before the material is passed to the reaction device 120. A metering pump (not shown) is provided in the material conveying pipe 119 to realize the accurate control of the material feed amount. In this way, the material passed to the reaction device 120 can be better reacted, and the resulting graphene composite material has higher uniformity and better dispersion.

In this embodiment, as the reaction device, two reaction kettles (not shown) connected in series are used, i.e., a first reaction kettle 121 and a second reaction kettle 122, which are numbered by the order the material passes through the two reaction kettles. The first reaction kettle 121 is an increased-pressure reaction kettle and the second reaction kettle 122 is a reduced-pressure reaction kettle. The material discharge end of the mixer 113 is connected to a material feed end of the first reaction kettle 121 by the material conveying pipe 119, and a material discharge end of the first reaction kettle 121 is connected to a material feed end of the second reaction kettle 122.

A spinneret (not shown) is provided at a material discharge end of the second reaction kettle 122. The crude composite material at the end of polymerization is passed to the spinneret to form strips of a specific shape, and the strips are conveyed to a cold water tank 140 for cooling. The continuous production equipment 100 according to this embodiment further includes a granulator 150 used for granulating the cooled crude composite material. The granulated crude composite material is conveyed to the extraction device 130 for extraction and purification.

The extraction device 130 includes an extractor 131 and an extract tank 132. A material discharge end of the granulator 150 is connected to a material feed end of the extractor 131. The crude composite material generated in the second reaction kettle 122 is passed to the cold water tank 140 and the granulator 150, and then extracted and separated in the extractor 131 to obtain the relatively pure graphene composite material and the polyamide monomer which has not been completely reacted. The extract containing the polyamide monomer is conveyed to the extract tank 132 by an extract conveying pipe 133 located at a material discharge end of the extractor 131, and mixed with the newly added graphene material in the extract tank 132. An ultrasonic disperser 115 is also provided in the extract tank 132. The ultrasonic disperser 115 ultrasonically peels and disperses the graphene material in the extract tank 132, so that the graphene material is uniformly dispersed in the polyamide monomer extract to form a mixture which is conveyed to the raw material melting kettle 111 to be recycled by the liquid conveying pipe 134. In another aspect, the extraction device 130 further includes a drier 135. The graphene composite material is conveyed to the drier 135 to be dried for standby by a product conveying pipe 136 located at the material discharge end of the extractor 131.

Embodiment 2

This embodiment provides graphene composite material, which is obtained by dispersing the graphene in the polyamide PA6 by the continuous production equipment 100 for graphene composite material according to Embodiment 1. The preparation method for graphene composite material will be described below.

S1: The caprolactam, water and graphene are added to the raw material melting kettle 111, and heated to 150° C. until caprolactam is completely molten. Caprolactam, water and graphene are sufficiently mixed by the high-shear emulsifying machine 114 and the ultrasonic disperser 115. The percentage by mass of water to caprolactam is 0.5%, and the percentage by mass of graphene to caprolactam is 0.5%. The high-shear emulsifying machine 114 has a speed of 600 r/min and an ultrasonic power of 10 kW, and the ultrasonic treatment lasts for 60 min.

S2: The auxiliary material ($TiO_2$ and water), polyamide monomer and graphene are added to the auxiliary material tank 112, and sufficiently mixed by the high-shear emulsifying machine 114 and the ultrasonic disperser 115. The percentage by mass of the graphene to the sum of the auxiliary material and the polyamide monomer is 0.5%. The high-shear emulsifying machine 114 has a speed of 500 r/min and an ultrasonic power of 15 kW, and the ultrasonic treatment lasts for 30 min.

S3: The raw material sufficiently mixed in S1 and the auxiliary material sufficiently mixed in S2 are passed to the mixer 113 for mixing to obtain a mixture. The percentage by mass of the auxiliary material to the raw material is 4%.

S4: The mixture is conveyed to the first reaction kettle 121 by the material conveying pipe 119. During the conveying process, the material in the material conveying pipe 119 is peeled and dispersed by the ultrasonic disperser 115, wherein the ultrasonic power is 20 kW.

S5: In the first reaction kettle 121, caprolactam is reacted with water, subjected to the ring-opening reaction and partial polymerization at 260° C., and then conveyed to the second reaction kettle 122.

S6: In the second reaction kettle 122, polycondensation occurred at 280° C., the viscosity is adjusted, and the molecular weight is balanced, the temperature is decreased to 200° C. and the products are discharged. Then, the crude composite material is obtained.

S7: The crude composite material is passed to the cold water tank 140 at 20° C. by the spinneret to be cooled to filaments, and the filaments are conveyed to the granulator 150 to be granulated.

S8: The granulated crude composite material is conveyed to the extractor 131 for extraction and separation to obtain the graphene composite material and the polyamide monomer which has not been completely reacted.

S9: The graphene composite material is conveyed to the drier 135 to be dried for standby. Meanwhile, the extract containing the polyamide monomer is conveyed to the extract tank 132, and in the extract tank 132, the polyamide monomer extract is mixed with the newly added graphene material to form a mixture. The mixture is conveyed to the raw material melting kettle 111 by the liquid conveying pipe 134 to be recycled.

Embodiment 3

This embodiment provides graphene composite material, which is obtained by dispersing the graphene in the polyamide PA6 by the continuous production equipment 100 for graphene composite material according to Embodiment 1. Except for any step of using a high-shear emulsifying machine, other steps of the preparation method for graphene composite material are the same as the preparation steps in Embodiment 2.

Embodiment 4

This embodiment provides graphene composite material, which is obtained by dispersing the graphene in the polyamide PA6 by the continuous production equipment 100 for graphene composite material according to Embodiment 1. Except for any step of using a high-shear emulsifying machine and an ultrasonic disperser, other steps of the preparation method for graphene composite material are the same as the preparation steps in Embodiment 2.

Embodiment 5

This embodiment provides graphene composite material, which is obtained by dispersing the graphene in the polyamide PA6 by the continuous production equipment 100 for graphene composite material according to Embodiment 1. The preparation method for graphene composite material will be described below.

S1: The caprolactam, water and amino graphene are added to the raw material melting kettle 111, and heated to 180° C. until caprolactam is completely molten, wherein, before adding the amino graphene to the raw material melting kettle 111, the amino graphene is dispersed and peeled in water under an ultrasonic power of 10 kW in advance. The caprolactam, water and graphene are sufficiently mixed by a high-shear emulsifying machine 114 and an ultrasonic disperser 115. The percentage by mass of water to caprolactam is 0.7%, and the percentage by mass of amino graphene to caprolactam is 0.8%. The high-shear emulsifying machine 114 has a speed of 650 r/min and an ultrasonic power of 10 kW, and the ultrasonic treatment lasts for 50 min.

S2: Auxiliary material ($TiO_2$ and water), polyamide monomer and amino graphene are added to the auxiliary material tank 112, and sufficiently mixed by the high-shear emulsifying machine 114 and the ultrasonic disperser 115. The percentage by mass of the amino graphene to the sum of the auxiliary material and the polyamide monomer is 0.4%. The high-shear emulsifying machine 114 has a speed of 600 r/min and an ultrasonic power of 12 kW, and the ultrasonic treatment lasts for 70 min.

S3: The raw material sufficiently mixed in S1 and the auxiliary material sufficiently mixed in S2 are passed to the mixer 113 for mixing to obtain a mixture. The percentage by mass of the auxiliary material to the raw material is 3%.

S4: The mixture is conveyed to the first reaction kettle 121 by the material conveying pipe 119. During the conveying process, the material in the material conveying pipe 119 is peeled and dispersed by the ultrasonic disperser 115, wherein the ultrasonic power is 15 kW.

S5: In the first reaction kettle 121, caprolactam is reacted with water, subjected to the ring-opening reaction and partial polymerization at 245° C., and then conveyed to the second reaction kettle 122.

S6: In the second reaction kettle 122, polycondensation occurred at 290° C., the viscosity is adjusted, and the molecular weight is balanced, the temperature is decreased to 210° C. and the products are discharged. Then, the crude composite material is obtained.

S7: The crude composite material is passed to the cold water tank 140 at 25° C. by the spinneret to be cooled to filaments, and the filaments are conveyed to the granulator 150 to be granulated.

S8: The granulated crude composite material is conveyed to the extractor 131 for extraction and separation to obtain the amino graphene composite material and the polyamide monomer which has not been completely reacted.

S9: The amino graphene composite material is conveyed to the drier 135 to be dried for standby. Meanwhile, the extract containing the polyamide monomer is conveyed to the extract tank 132, and in the extract tank 132, the polyamide monomer extract is mixed with the amino graphene material newly added by an external graphene charge pipe to form a mixture. The mixture is conveyed to the raw material melting kettle 111 by the liquid conveying pipe 134 to be recycled.

Embodiment 6

This embodiment provides graphene composite material, which is obtained by dispersing the amino graphene in the polyamide PA6 by the continuous production equipment 100 for graphene composite material according to Embodiment 1. Except for the step "before adding the amino graphene to the raw material melting kettle 111, the amino graphene is dispersed and peeled in water under an ultrasonic power of 10 kW in advance" in S1 and the step of changing "in the extract tank 132, the polyamide monomer extract is mixed with the amino graphene material newly added by an external graphene charge pipe to form a mixture. The mixture is conveyed to the raw material melting kettle 111 by the liquid conveying pipe 134 to be recycled" in S9 to "the polyamide monomer extract in the extract tank 132 is conveyed to the raw material melting kettle 111 by the liquid conveying pipe 134 to be recycled", other steps of the preparation method for graphene composite material are the same as the preparation steps in Embodiment 5.

Example 1

The graphene composite material according to embodiments 2 to 6 is tested, as test samples, in terms of resistance, bacteriostasis rate, far infrared radiation, solar ultraviolet radiation protective properties, and burning characteristics. The specific test methods will be described below.

1. Resistance Tests on the Test Samples

The test samples were tested after being washed for 100 times, according to the National Standard GB12014-2009 "STATIC PROTECTIVE CLOTHING". The test results are shown in Table 1.

2. Bacteriostasis Rate Tests on the Test Samples

The test samples were tested against *staphylococcus aureus* and *candida albicans*, respectively, after being washed for 5 times, according to the National Standard GB20944.3-2008 "TEXTILES—EVALUATION FOR ANTIBACTERIAL ACTIVITY". The test results are shown in Table 1.

3. Far Infrared Radiation Tests on the Test Samples

The test samples were tested after being washed for 5 times, according to the National Standard GB30127-2013 "TEXTILES—TESTING AND EVALUATION FOR FAR INFRARED RADIATION PROPERTIES". The test results are shown in Table 1.

4. Solar Ultraviolet Radiation Protective Properties Tests on the Test Samples

The test samples were tested after being washed for 5 times, according to the National Standard GB18830-2009 "TEXTILES—EVALUATION FOR SOLAR ULTRAVIOLET RADIATION PROTECTIVE PROPERTIES". The test results are shown in Table 1.

5. Burning Characteristics Tests on the Test Samples

Five block samples, having a size of 8 cm×1 cm×0.4 cm, from each test sample were tested, according to the National Standard GB2408-2008 "PLASTICS—DETERMINATION OF BURNING CHARACTERISTICS—HORIZONTAL AND VERTICAL TEST". The test results are shown in Table 2, wherein $t_1$ denotes the first afterflame time, $t_2$ denotes the second afterflame time, and $t_3$ denotes the third afterflame time.

TABLE 1

Results of Performance Tests on the Graphene Composite Material

| Test items | | Measured Value | | | | |
|---|---|---|---|---|---|---|
| | | Embodiment 2 | Embodiment 3 | Embodiment 4 | Embodiment 5 | Embodiment 6 |
| Point-to-point resistance of the fabric (Ω) | | $1.7 \times 10^6$ | $7.2 \times 10^{12}$ | $3.8 \times 10^{13}$ | $1.3 \times 10^6$ | $2.7 \times 10^8$ |
| Bacteriostasis rate | *Staphylococcus aureus* (100%) | >99 | 82 | 74 | >99 | 86 |
| | *Candida albicans* (100%) | >99 | 79 | 83 | >99 | 85 |
| Far infrared radiation | Far infrared emissivity | 0.92 | 0.88 | 0.88 | 0.93 | 0.90 |
| | Far infrared radiation temperature rise (° C.) | 1.6 | 1.4 | 1.4 | 1.6 | 1.5 |
| Solar ultraviolet radiation protective properties | UPF average | 291 | 304 | 311 | 290 | 296 |
| | UPF (Ultraviolet Protection Factor) | >50 | >50 | >50 | >50 | >50 |
| | Average UVA transmittance (100%) | 1.1 | 2.3 | 3.4 | 1.0 | 1.5 |
| | Average UVB transmittance (100%) | 0.2 | 4.6 | 3.7 | 0.2 | 1.0 |

TABLE 2

Results of Burning Characteristics Tests on the Graphene Composite Material

| Test items | | | Test sample No. | Horizontal Burning Test | | | | | |
|---|---|---|---|---|---|---|---|---|---|
| | | | | Afterflame time for a single test sample $t_1/t_2$ (s) | Total afterflame time for a group of test samples $T_f$ (s) | Afterflame time and afterglow time for a single test sample, after second application of flame $t_2 + t_3$ (s) | Do the afterflame time and the afterglow time spread to the fixture? | Do the flame particles or droplets ignite the cotton pad? | Oxygen index (%) |
| | V0-level index | | — | ≤10 | ≤50 | ≤30 | No | No | — |
| Test results | 23 ± 2° C., 50 ± 5% RH, 48 h | Embodiment 2 | 1 | 2/3 | 18 | 3 | No | No | 27.5 |
| | | | 2 | 3/0 | | 0 | No | No | |
| | | | 3 | 5/0 | | 0 | No | No | |
| | | | 4 | 0/2 | | 2 | No | No | |
| | | | 5 | 1/2 | | 2 | No | No | |
| | | Embodiment 3 | 1 | 3/10 | 72 | 10 | No | Yes | 22.3 |
| | | | 2 | 5/12 | | 12 | Yes | Yes | |
| | | | 3 | 3/10 | | 10 | No | Yes | |
| | | | 4 | 3/8 | | 8 | Yes | Yes | |
| | | | 5 | 3/15 | | 15 | Yes | Yes | |
| | | Embodiment 4 | 1 | 2/15 | 68 | 14 | No | Yes | 23.5 |
| | | | 2 | 2/10 | | 6 | Yes | Yes | |
| | | | 3 | 3/10 | | 18 | No | Yes | |
| | | | 4 | 5/12 | | 12 | No | Yes | |
| | | | 5 | 5/12 | | 10 | No | Yes | |
| | | Embodiment 5 | 1 | 2/3 | 16 | 2 | No | No | 29 |
| | | | 2 | 2/0 | | 0 | No | No | |
| | | | 3 | 4/0 | | 0 | No | No | |
| | | | 4 | 0/2 | | 2 | No | No | |
| | | | 5 | 1/2 | | 2 | No | No | |
| | | Embodiment 6 | 1 | 2/5 | 36 | 5 | No | No | 25.1 |
| | | | 2 | 3/7 | | 5 | No | Yes | |
| | | | 3 | 3/5 | | 4 | No | No | |
| | | | 4 | 2/4 | | 3 | Yes | No | |
| | | | 5 | 1/4 | | 4 | Yes | Yes | |

It can be known from Table 1 that the graphene composite material according to Embodiment 2 of the present invention has a resistance up to $1.7 \times 10^6 \Omega$. It is material with good antistatic property. Meanwhile, it has excellent bacteriostasis effect against *staphylococcus aureus* and *candida albicans*, with a bacteriostasis rate greater than 99%. This graphene composite material is also a good far infrared radiation textile, with a far infrared emissivity up to 0.92 and a far infrared radiation temperature rise of 1.6° C. In addition, this graphene composite material also has excellent solar ultraviolet radiation protective properties, with an UPF (Ultraviolet Protection Factor) greater than 50%. In addition, it can be known from the data from Embodiments 2 to 4 that products produced by the high-shear emulsifying machine and the ultrasonic disperser during the preparation have better overall performance. It can be known from the data from Embodiments 5 to 6 that products produced by dispersing and peeling the graphene in a liquid during the preparation have better over performance than that of products produced without this operation. It can be known from Table 2 that the graphene composite material according to Embodiment 2 and Embodiment 5 can reach the intrinsic V0-level flame-retarded performance, without spread or droplets. It exhibits excellent flame-retarded performance.

Example 2

By the continuous production equipment 100 for graphene composite material according to Embodiment 1, tests were conducted respectively in a case where the extraction device 130 is used (scheme 1) and in a case where the extraction device 130 is not used (scheme 2), and the utilization rate of the raw material is calculated by the following equation: utilization rate=product mass/total mass of the raw material×100%. In order to ensure the accuracy of test results, for each scheme, three different mass metrics are used for calculation. The results of calculation are shown in Table 3.

TABLE 3

Test Results of Utilization Rate of the Raw Material

| | | Total mass of the raw material/kg | Product mass/kg | Utilization rate of the raw material/% |
|---|---|---|---|---|
| Scheme 1 | 1 | 3780 | 3379 | 89.4 |
| | 2 | 2550 | 2303 | 90.3 |
| | 3 | 4325 | 3845 | 88.9 |
| Scheme 2 | 1 | 3765 | 3023 | 80.3 |
| | 2 | 2610 | 2059 | 78.9 |
| | 3 | 4310 | 3439 | 79.8 |

It can be known from Table 3 that, by the comparison between the case where the extraction device 130 is used and the case where the extraction device 130 is not used, the whole synthesis process improves the utilization rate of the raw material by about 10% after the extraction device 130 is used. For large-scale industrial production, the resulting cost reduction is quite considerable.

In conclusion, the present invention provides continuous production equipment for graphene composite material, including a raw material preparation device and a reaction device. The raw material preparation device includes a raw material melting kettle which is provided with a high-shear emulsifying machine and an ultrasonic disperser. By the continuous production equipment, during the preparation of polyamide monomer, graphene can be better dispersed in the polyamide monomer by the combined action of high-shear stirring and ultrasonic dispersion while melting the raw material. In this way, graphene composite material with good dispersibility and excellent properties is obtained. Meanwhile, the continuous production equipment further includes an extraction device by which the polyamide monomer which has not been completely reacted during a reaction can be recycled. In this way, the raw material utilization rate is improved and the production cost is reduced. The present invention further provides a preparation method for graphene composite material. The method solves the problem of low dispersibility of graphene composite material during large-scale industrial production. With the use of the continuous production equipment for graphene composite material, during the preparation, graphene can be effectively dispersed in the polyamide by the combined action of high-shear stirring and ultrasonic dispersion. In this way, graphene composite material with good dispersibility and excellent properties is obtained. Meanwhile, by this preparation method, the polyamide monomer which has not been completely reacted during a reaction can be recycled. In this way, the raw material utilization rate is improved and the production cost is reduced.

The foregoing descriptions are merely preferred embodiments of the present invention, and not intended to limit the present invention. For those skilled in the art, various modifications and changes may be made to the present invention. Any modifications, equivalent replacements, improvements and the like made within the spirit and principle of the present invention shall be included in the protection scope of the present invention.

INDUSTRIAL APPLICABILITY

According to the implementations of the present invention, by the continuous production equipment and the preparation method for graphene composite material, the graphene can be effectively dispersed in the polyamide monomer and the dispersion effect is very good. The graphene can be always in the liquid-state ultrasonic peeling state. This effectively avoids the agglomeration of the graphene, so that the large-scale industrial production of the graphene composite material can be realized. The continuous production equipment can further recycle the polyamide monomer which has not been completely reacted. In this way, the industrial production cost is effectively reduced.

The invention claimed is:

1. Continuous production equipment for graphene composite material, comprising:
    a raw material preparation device;
    a reaction device, a material discharge end of the raw material preparation device being connected to the reaction device; and
    an extraction device configured to extract and purify crude composite material obtained from the reaction device, a material feed end of the extraction device being connected to the material discharge end of the reaction device, and a material discharge end of the extraction device being configured to convey polyamide monomer extract obtained by extraction to a liquid conveying pipe of the raw material preparation device;
    wherein the raw material preparation device comprises a raw material melting kettle configured to melt polyamide monomer and mix the molten polyamide monomer with graphene, and the raw material melting kettle is provided with a high-shear emulsifying machine and an ultrasonic disperser.

2. The continuous production equipment according to claim 1, wherein an ultrasonic disperser is provided in at least one pipe of the continuous production equipment.

3. The continuous production equipment according to claim 1, wherein a material discharge end of the raw material melting kettle is communicated with a material feed end thereof by a bypass pipe in which an ultrasonic disperser is provided.

4. The continuous production equipment according to claim 1, wherein the raw material preparation device is connected to a material feed end of the reaction device by a material conveying pipe in which an ultrasonic disperser is provided.

5. The continuous production equipment according to claim 1, wherein the extraction device comprises an extractor and an extract tank; a material feed end of the extractor is communicated with the material discharge end of the reaction device and a material discharge end of the extractor is communicated with a material feed end of the extract tank; a material discharge end of the extract tank is communicated with the raw material preparation device by the liquid conveying pipe; and an external graphene charge pipe is communicated with the extract tank.

6. The continuous production equipment according to claim 1, wherein an ultrasonic disperser is provided in the extract tank.

7. The continuous production equipment according to claim 1, wherein the raw material preparation device further comprises an auxiliary material tank in which a high-shear emulsifying machine and an ultrasonic disperser are provided.

8. A preparation method for graphene composite material, comprising the steps of:
    melting polyamide monomer and graphene material in a raw material melting kettle, and peeling, dispersing and mixing under the combined action of a high-shear emulsifying machine and an ultrasonic disperser to obtain a mixture;
    conveying the mixture to a reaction device for polymerization reaction to obtain crude composite material; and,
    conveying the crude composite material to an extraction device for extraction and separation to obtain graphene composite material, and conveying polyamide monomer extract obtained by extraction back to a raw material preparation device by the liquid conveying pipe for recycle.

9. The preparation method for graphene composite material according to claim 8, wherein the graphene has a functional group which is selected from one or more of amide, amino, carboxyl, sulfonic group, epoxy group and hydroxyl, preferably amino.

10. The preparation method for graphene composite material according to claim 8, wherein the step of melting polyamide monomer and graphene material in a raw material melting kettle further comprises the steps of:
    peeling and dispersing the graphene material in a liquid in ultrasonic condition, then adding the obtained substance to the molten polyamide monomer, and mixing, wherein the liquid is water or a polyamide monomer solution with water as a solvent.

11. The preparation method for graphene composite material according to claim 10, wherein the ultrasonic condition is a condition having an ultrasonic power of 1-20 kW; and the percentage by mass of the water to the polyamide monomer in the polyamide monomer solution is 0.5-30%.

12. The preparation method for graphene composite material according to claim 8, wherein the polymerization reaction comprises a first polymerization performed under an increased pressure and at a temperature of 240-269° C. and a second polymerization performed under a reduced pressure and at a temperature of 270-300° C.

13. The preparation method for graphene composite material according to claim 8, wherein the temperature for melting in the raw material melting kettle is 70-100° C.

14. The preparation method for graphene composite material according to claim 8, wherein the mixture goes into a bypass pipe from a material discharge end of the melting kettle and back to the melting kettle from a material feed end of the melting kettle to realize circulation; and during the circulation, the mixture inside the bypass pipe is ultrasonically peeled and dispersed by an ultrasonic disperser.

15. The preparation method for graphene composite material according to claim 8, wherein the mixture is conveyed to the reaction device by a material conveying pipe; and during the material conveying process, the mixture within the material conveying pipe is ultrasonically peeled and dispersed by an ultrasonic disperser.

16. The preparation method for graphene composite material according to claim 8, wherein the preparation method further comprises the steps of: before conveying the polyamide monomer extract back to the raw material preparation device, mixing the polyamide monomer extract with graphene material, and ultrasonically peeling and dispersing by an ultrasonic disperser.

17. The preparation method for graphene composite material according to claim 8, wherein the high-shear emulsifying machine has a stirring speed of 500-10000 r/min and the ultrasonic disperser has an ultrasonic power of 1-20 kW.

* * * * *